Nov. 3, 1925.  
F. J. HAYNES  
AUTOMOBILE  
Filed Aug. 12, 1922
1,559,614
2 Sheets-Sheet 1
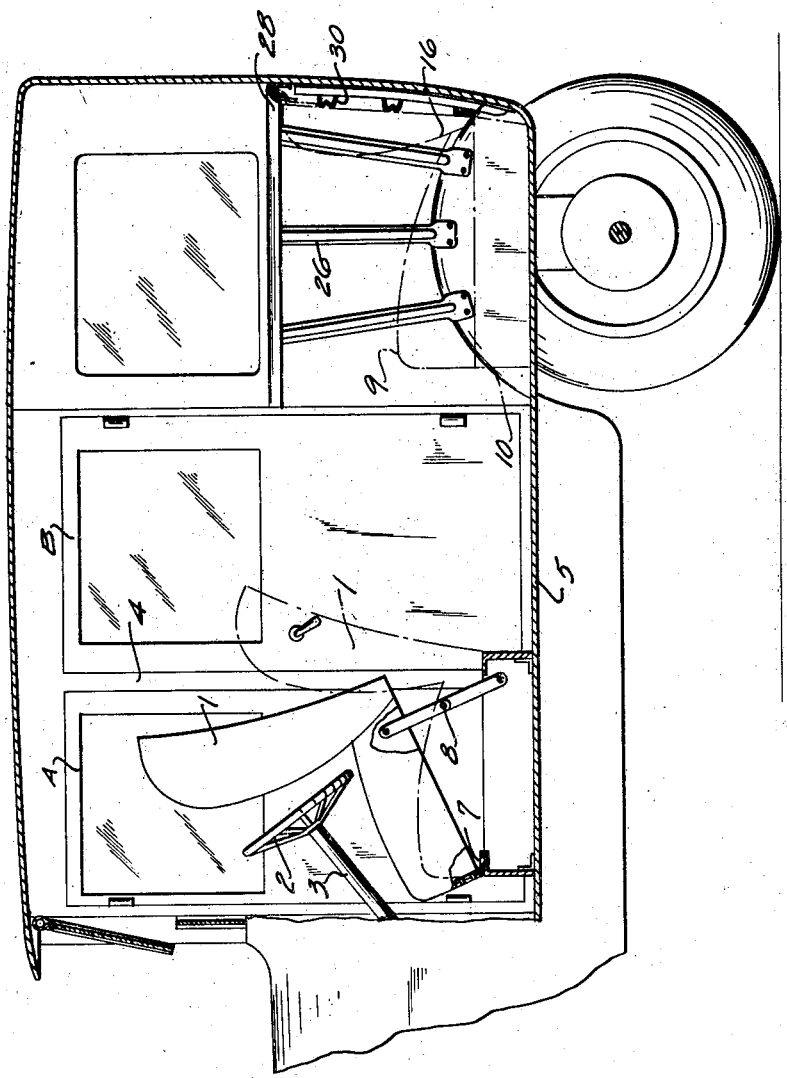
Inventor  
Frederick J. Haynes  
By his Attorneys

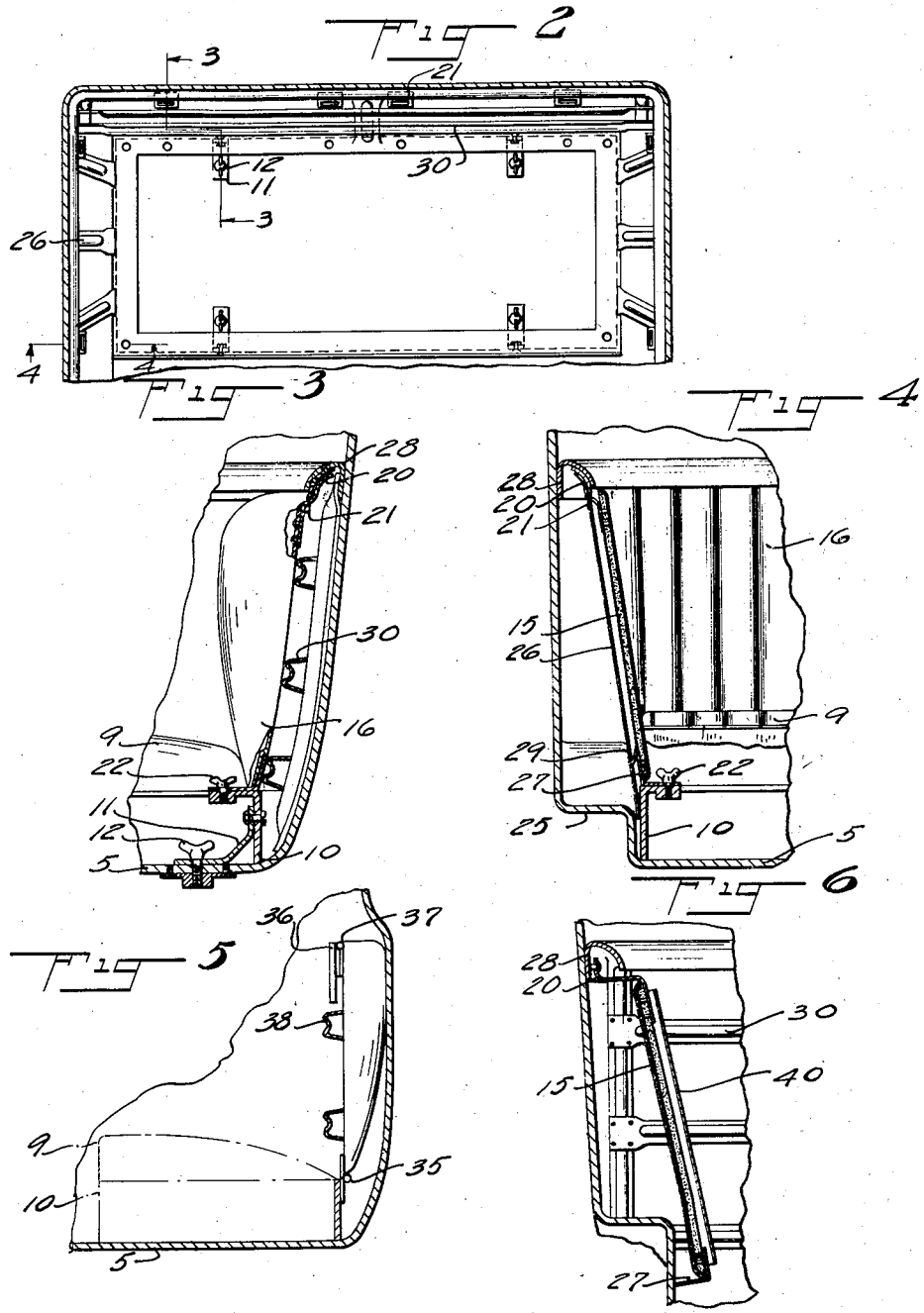

Patented Nov. 3, 1925.

1,559,614

UNITED STATES PATENT OFFICE.

FREDERICK J. HAYNES, OF DETROIT, MICHIGAN, ASSIGNOR TO DODGE BROTHERS, INC., OF DETROIT, MICHIGAN, A CORPORATION OF MARYLAND.

AUTOMOBILE.

Application filed August 12, 1922. Serial No. 581,298.

*To all whom it may concern:*

Be it known that I, FREDERICK J. HAYNES, a citizen of the United States, residing at Detroit, Michigan, have invented a certain new and useful Improvement in Automobiles, of which the following is a clear, full, and exact description.

My invention relates to an automobile, and one of my objects is to provide a construction by which a sedan, for example, may be quickly converted from a passenger car to one adapted for delivery service and the effective carrying capacity materially increased.

In a closed-body car, such for example as a sedan, the carrying capacity to the rear of the front seat is limited. To allow room enough behind the steering wheel, the back of the front seat usually extends considerably to the rear of the side frame of the rear door, rendering it difficult to introduce bulky packages or boxes through the rear door. The rear seat cushion is usually removable for the purpose of cleaning and to obtain access to the seat box underneath the same. This box, which acts as a support for the seat cushion and also as a storage space, has heretofore been built in, that is, made permanent, and as it is raised considerably above the floor it interferes materially with the storage capacity of the car. The interior of the car is also provided with upholstery at each side of the rear seat and at the back, which would be chafed, stained and injured if bulky boxes and other packages were transported.

Farmers and others who have only one automobile require a construction which will allow of the storage and transportation of a considerable quantity of goods. The closed body automobile is the type which is indicated as the one especially to be desired in the future, as this type is rapidly increasing in popularity. One object of my invention is to provide a car which is especially useful for a person who has only one car, which shall be so constructed and arranged that it may be used as an ordinary passenger car or quickly adapted for the transportation of goods without injury to the body or interior upholstery. This result I have accomplished by the means hereafter to be described. While I have described it as particularly applicable to a body of the sedan type, it will be obvious that my invention is applicable to other styles of body, without departing from the spirit of my invention as claimed.

In the drawings which represent the form of my invention which I now prefer, Fig. 1 is a vertical central section through a sedan body;

Fig. 2 is a plan view of the rear end of the body portion of the sedan, showing the supporting means in place for the rear seat, and the rear seat removed to show the fender bars at the sides of the body, and stiffening bars at the rear thereof;

Fig. 3 is a detail sectional view in elevation taken through the section line 3—3 of Fig. 2;

Fig. 4 is a detail sectional view in elevation taken on line 4—4 of Fig. 2 and showing a side cushion in place;

Fig. 5 is a detail sectional view of a modified means for supporting the rear seat, by means of which it is unnecessary to remove bodily the rear seat cushion; and Fig. 6 is a detail view of a modified construction by means of which the side upholstery sections may be reversed and fastened in place with the upholstery facing inwardly.

The car is provided with the usual doors,—in the present case two pairs of doors, one pair A in front, and the other pair B in rear. Opposite the front pair is a front seat 1 with the usual steering wheel 2 and its column 3. Between the doors is the usual door frame 4 extending upward from the floor 5.

As illustrated herein, the back of the front seat, when in its normal position shown in dotted lines, extends to the rear of the plane joining the rear sides of the door frame 4, which would interfere with the entrance of bulky packages through the rear door opening.

In order to clear this space, the back of the seat is made so that it may be shifted forward to clear this plane. This may be done by pivoting the same, and in the present instance I have shown the combined seat and back portion as pivoted at 7 so that it may be tilted forward as indicated in Fig. 1. It may be held in this position by a toggle-joint strut 8, if desired. This construction allows free access to the interior through the rear door and is particularly advantageous when bulky packages are to be introduced into the interior.

9 indicates the rear seat such as the ordinary seat cushion. This is supported at any desired height above the level of the floor by any desired means. Such support may be, if desired, a bottomless box 10, which is made readily removable in the sense that it may readily be shifted from its position obstructing the floor space to a position such that the floor space is rendered unobstructed by it. I prefer to make it removable bodily and have so shown it in Figs. 2 and 3. A convenient means is provided consisting of feet 11 perforated to accommodate a wing bolt 12 passing therethrough and into a threaded hole or socket in the floor and by which the box support may be readily attached in position or detached therefrom by a person in the interior of the body and without the necessity of getting underneath the car.

The floor 5, constructed of substantial material such as will bear the weight of passengers or heavy boxes, extends across the body and is extended rearwardly underneath the rear seat and substantially to the rear end of the interior of the body. When the rear seat cushion is taken out and its support removed, a clear space from the back of the front seat to substantially the rear end of the body is provided, thus eliminating the permanent rear seat box of the ordinary construction of such vehicles. This materially increases the carrying capacity of the vehicle and allows a greater quantity of goods to be stored in the interior.

A closed-body car such as illustrated is provided with upholstery over the front-seat cushion, back, the sides of the doors below the windows, over the body sections at either side and over the back of the rear seat. Transportation of boxes and other packages in the vehicle would stain, chafe and otherwise injure such upholstery if made of fabric, as is usual, and I prefer to make such upholstery of leather or other material which will not easily chafe and which may be readily cleaned or washed.

Such upholstered sections adjacent the rear seat have heretofore been made permanent, that is, not removable. I prefer to make them in individual sections, as indicated at 15, and 16, which may be detached readily and removed bodily if desired when goods are to be carried in the interior. Various expedients for accomplishing this result may be provided. In the present embodiment I have shown each section provided at one side, preferably the top, with one or more tongues 20 and the body with corresponding slotted ears 21. When it is desired to attach a section, the tongues are passed through the slots, and the two then act as pivots so that the section may be swung down to its normal position. These connections are preferably made of spring metal and so formed that, as indicated in Figs. 3 and 4, the tongue will engage the body portion just before the section reaches its normal position, and, when it is forced into place and fastened by the wing nuts 22, it will be held under resilient tension, thereby preventing any rattle between the parts.

In order to increase the storage space further the body is preferably formed over each of the rear wheels with a recess 25, as indicated more clearly in the transverse detail section Fig. 4. Suitable fender bars 26 are provided, preferably fastened at the bottom to the metal body at 27 and at the top to the tacking-strip 28 of the body. These project slightly outward from a plane joining the tacking-strip and portion 29 over the wheel so as to protect the body from injury. The bars 26 also operate as strengthening or stiffening members for the body itself.

Similar protecting and stiffening bars 30, in this case running longitudinally, may be provided to the rear of the rear section.

A clear and substantially unobstructed space for transportation of boxes, packages, etc., is thus provided with suitable protection of the body against injury when the rear seat, its support and the side and back upholstered sections are removed from their positions.

I am aware that it may not be necessary in all cases to remove bodily the rear section. In Fig. 5, I for example, have shown a modified construction in which this section is pivoted to the body at 35 and provided with a support 36 pivoted at 37. The section may be removed from its normal dotted-line position by swinging the same upwardly, as indicated in full lines, where it will nest into or be received by a recess in the body provided behind the back section, the supporting board 36 being folded down as indicated. The frame of the cushion may itself form the protecting fenders, or additional transverse fenders 38 may be provided.

Instead of taking the side upholstery sections out of the car, it may be desirable, if the storage space provided by the recess 25 is not desired, merely to reverse such section and again fasten it in place but with the upholstered face contained within the recess as indicated in Fig. 6. The rear face of the frame of this section, provided with additional fender bars such as 40 if desired, will act as a protecting device for preventing chafing or injury to the vehicle body.

By the foregoing construction I have provided an arrangement of parts by which a car of the sedan type, for example, may be readily and quickly converted into an effective carrier for the transportation of a large quantity of goods, without injury to the body or the upholstery, and which may quickly be reconverted into an upholstered type for ordinary pleasure use.

I am aware that various modifications of the above described construction may be made without departing from the spirit of my invention as claimed, and I do not limit myself to the particular arrangements which have been set forth above as an illustrative example.

What I claim is—

1. An automobile having front and rear seats, upholstered sections adjacent said rear seat, and a pair of doors rearwardly of the front seat, the back of the front seat being located to the rear of a plane passing through the forward edge of the door, means whereby the back of the front seat may be shifted forward to clear the door space, means for detachably fastening the rear seat and its support to the floor of the car, and means for detachably fastening the upholstered sections to the car body so as to be held by resilient pressure, whereby when the said rear seat and upholstered sections are removed the portion to the rear of the front seat is rendered substantially unobstructed.

2. An automobile body having an upholstered section detachably pivoted to the body at one side by a tongue and slot connection, means for detachably fastening another side of the said section into position, the said tongue and slot connection being so constructed and arranged that when the section is swung thereon as a pivot and fastened at the other side the section is held by resilient pressure between said tongue and slot connection and the fastened side of the said section.

3. An automobile having front and rear seats, and a pair of doors rearwardly of the front seat, means whereby the front seat may be shifted forwardly to clear the door space, a support for said rear seat, means for detachably fastening the said support to the floor of the car by means accessible within the vehicle body, recesses in the vehicle body formed over the rear wheels, and beside the rear seat to attain readily accessible storage space, and upholstered sections adapted to cover the said recesses provided with means whereby the said sections may be readily removed.

Signed at Detroit, Michigan this 7th day of August 1922.

FREDERICK J. HAYNES.